Sept. 3, 1935.  E. J. VON PEIN ET AL  2,013,592
DRUM SCALE
Filed June 14, 1932  6 Sheets-Sheet 1
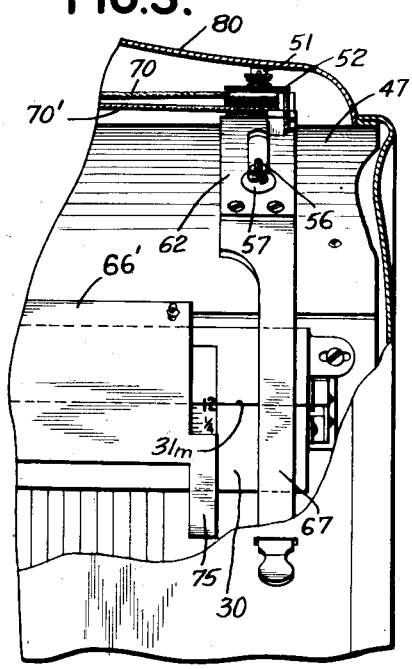
FIG.5.
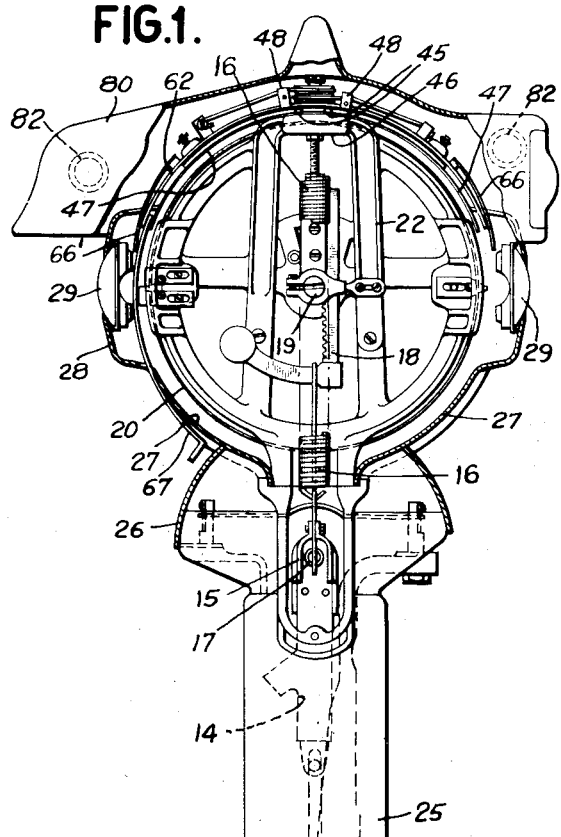
FIG.1.
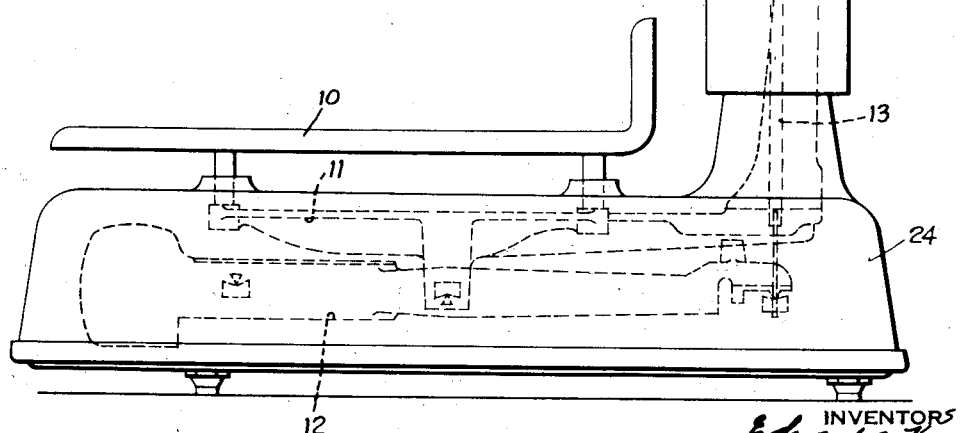
INVENTORS
Edward J. Von Pein
Ernest A. Pensyl
BY
A.C.M. Wilson
ATTORNEY

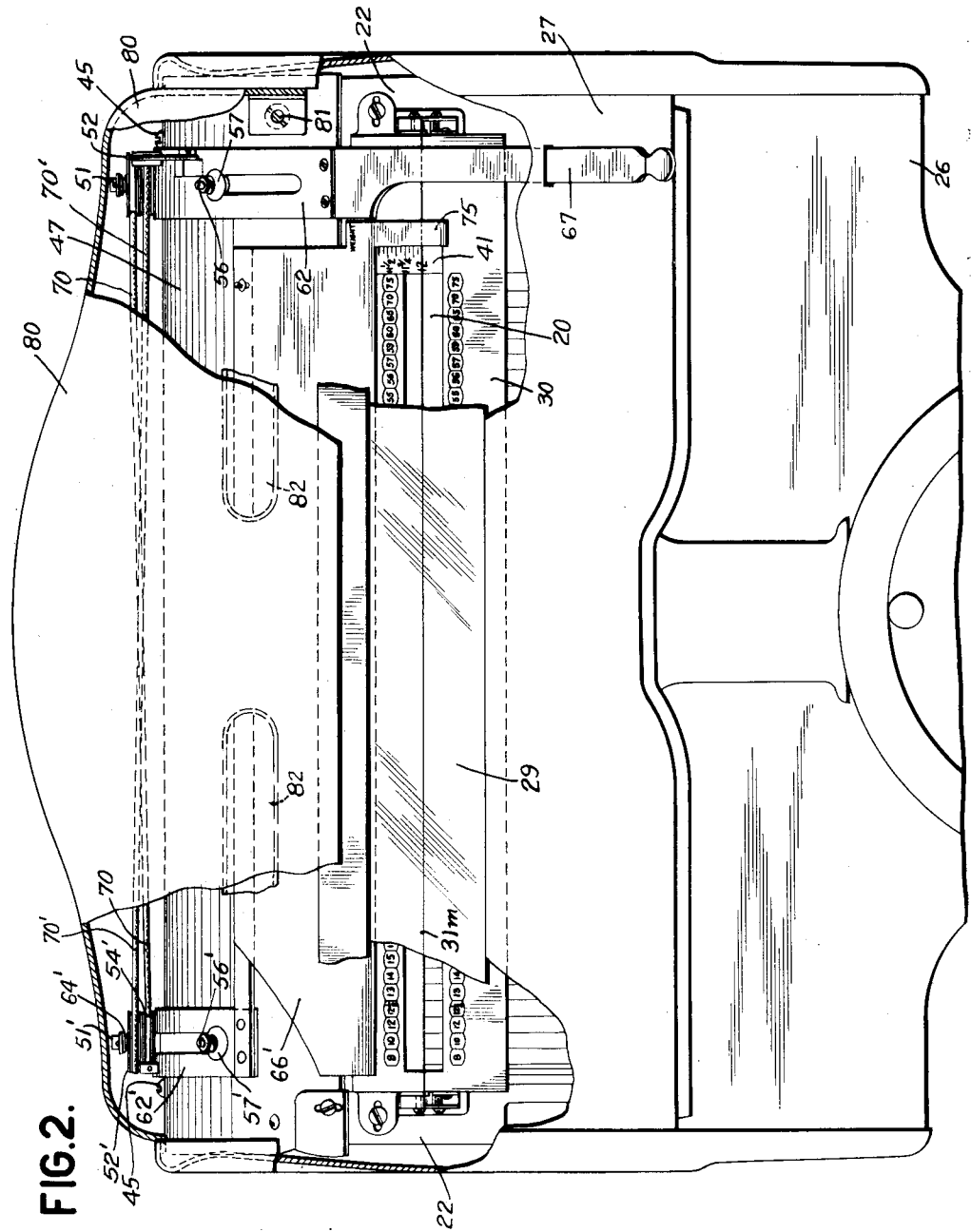

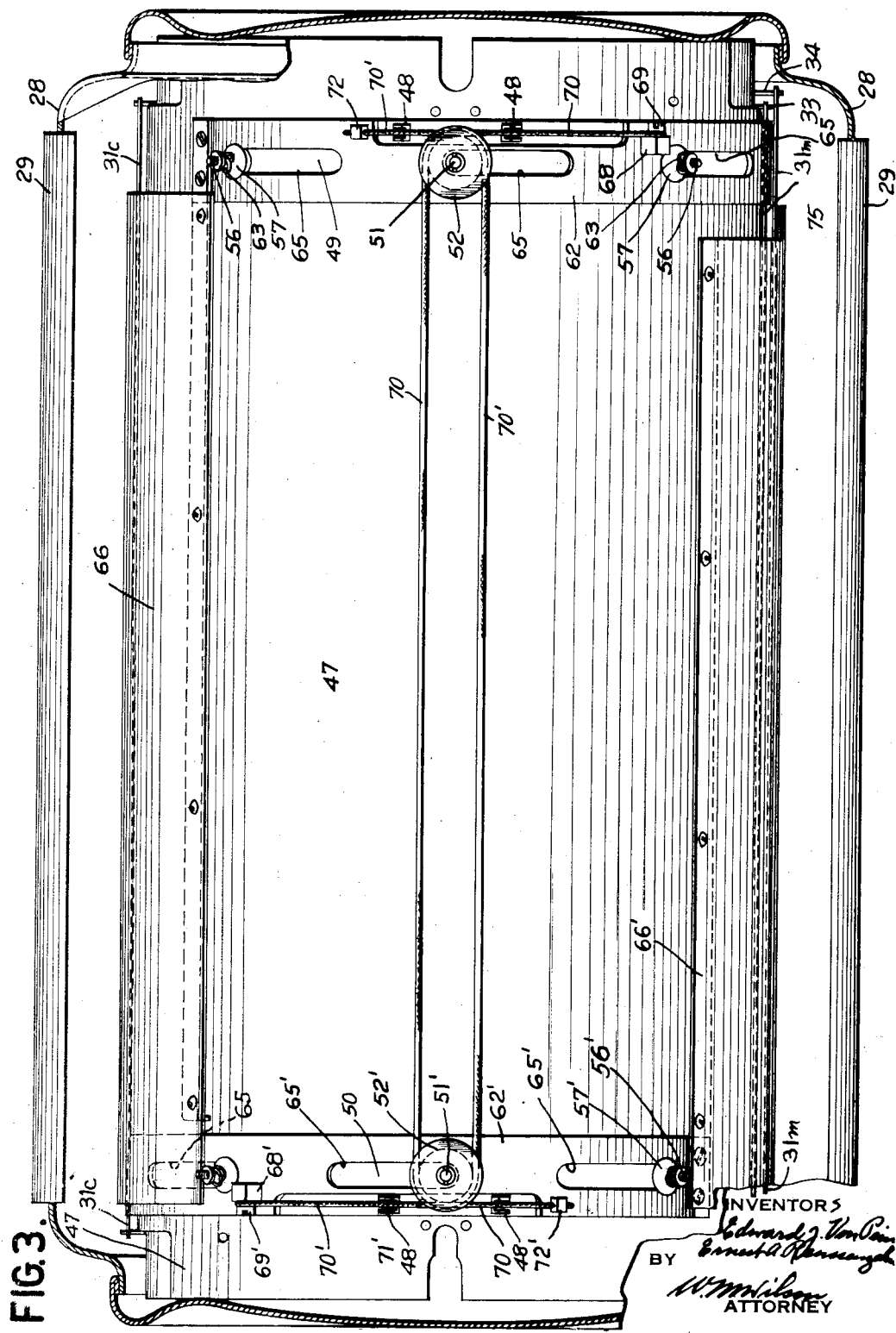

Sept. 3, 1935.  E. J. VON PEIN ET AL  2,013,592
DRUM SCALE
Filed June 14, 1932  6 Sheets-Sheet 4
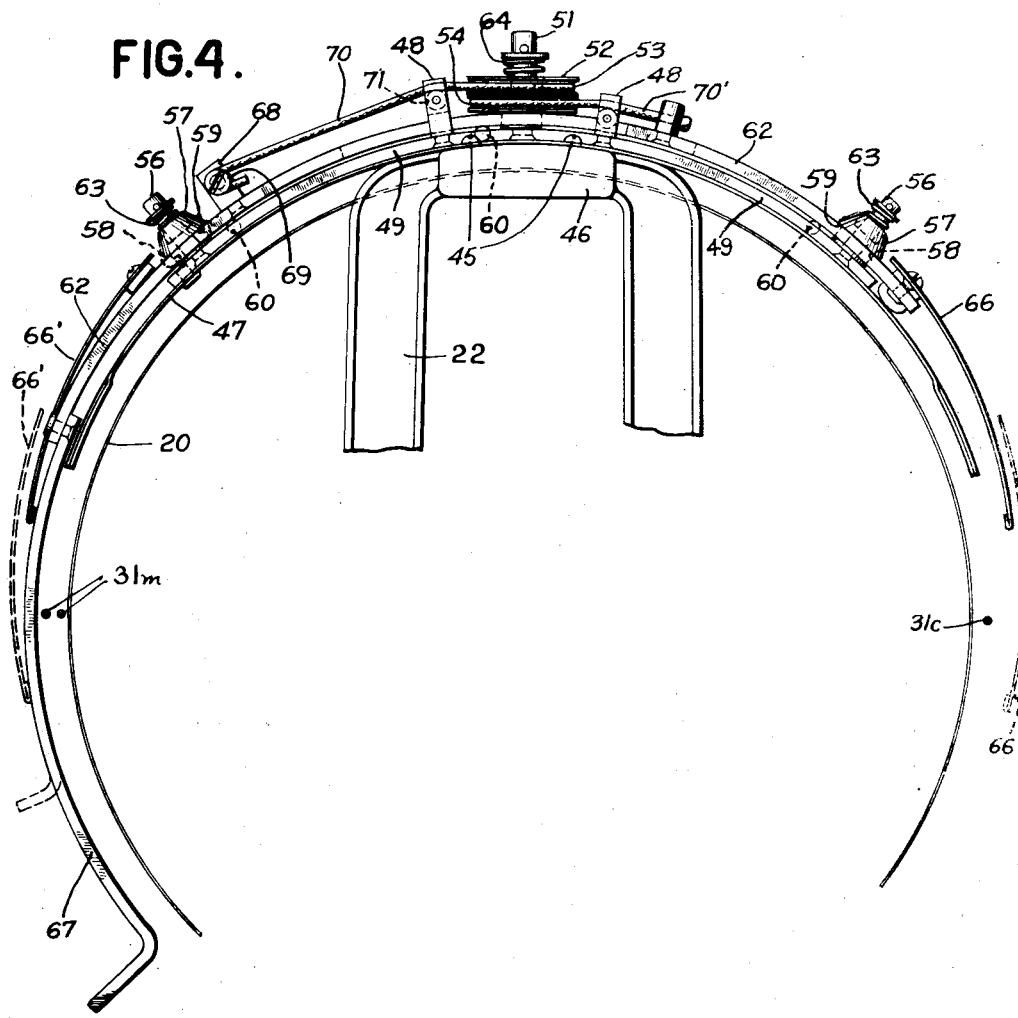
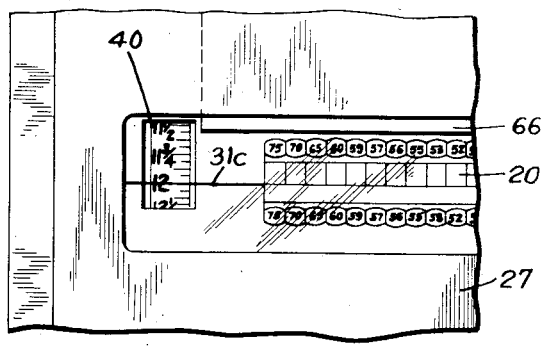

Sept. 3, 1935. E. J. VON PEIN ET AL 2,013,592
DRUM SCALE
Filed June 14, 1932 6 Sheets-Sheet 5
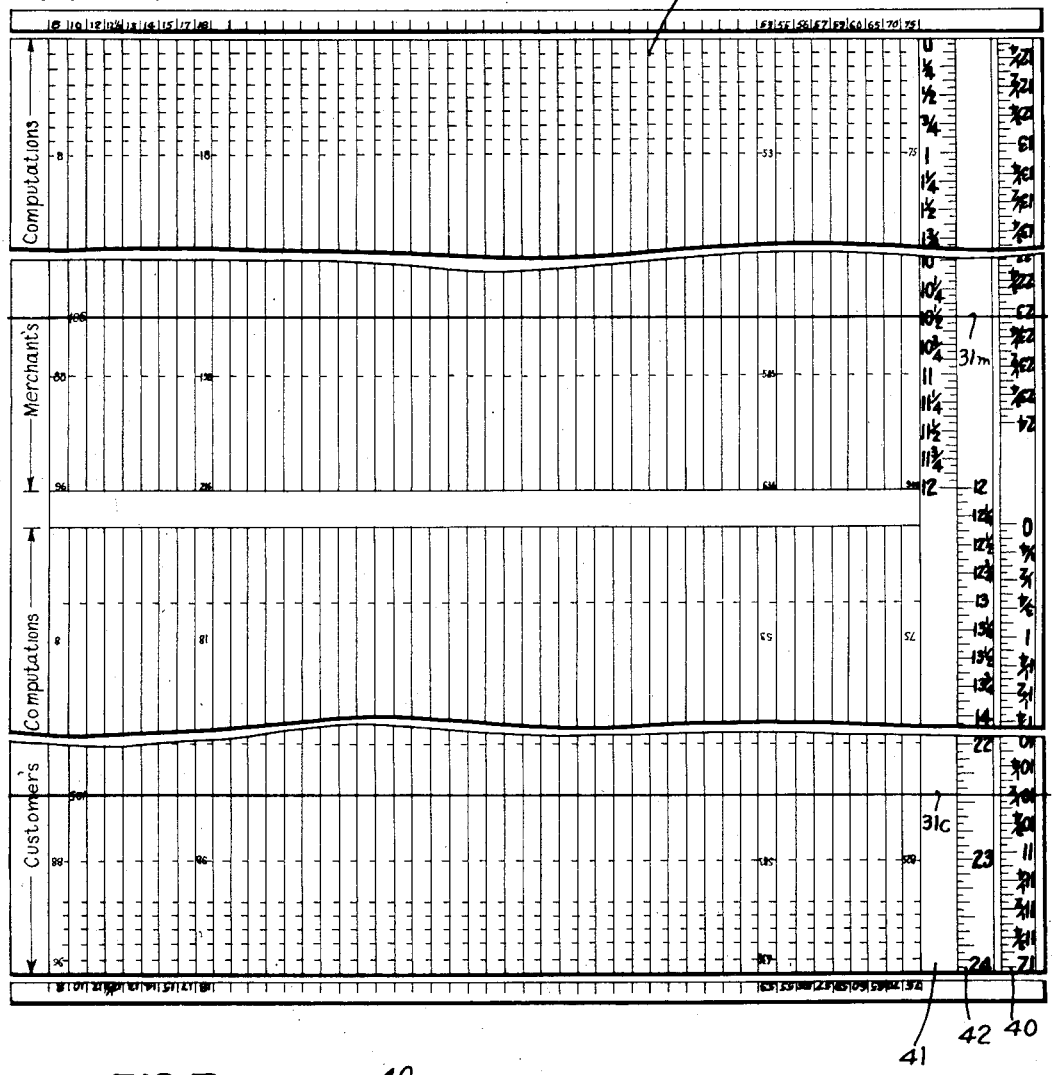
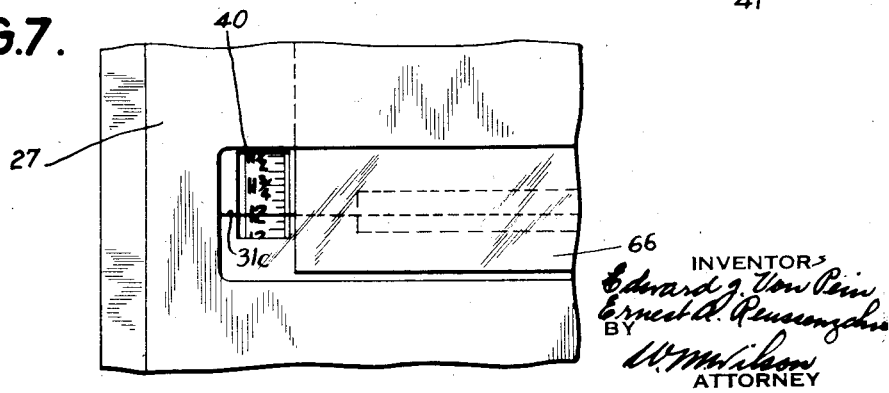

Sept. 3, 1935. E. J. VON PEIN ET AL 2,013,592
DRUM SCALE
Filed June 14, 1932 6 Sheets-Sheet 6
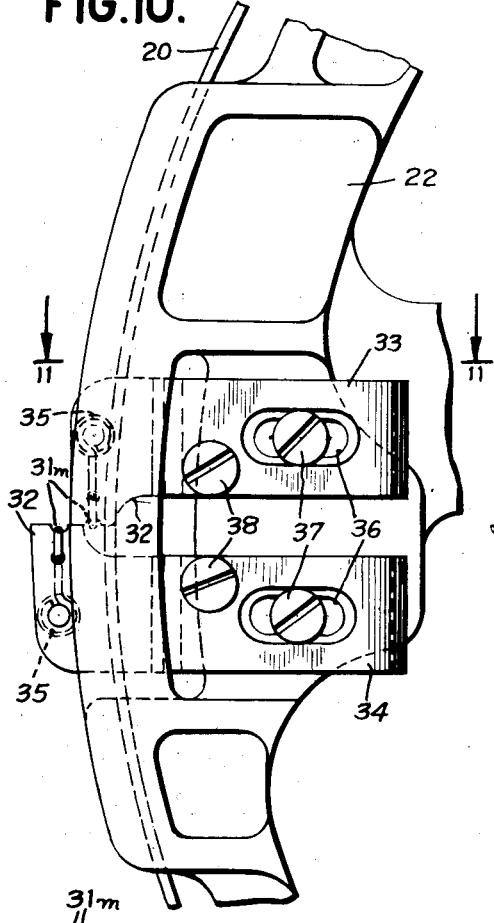
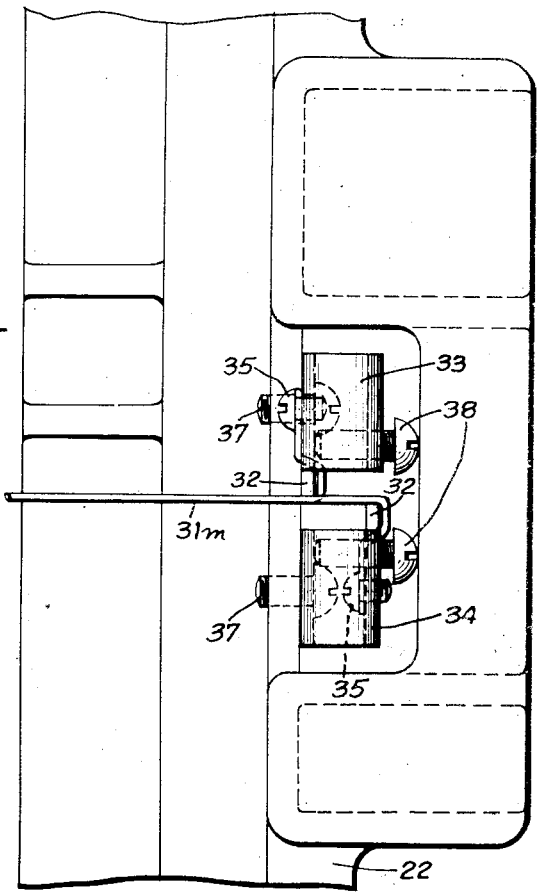
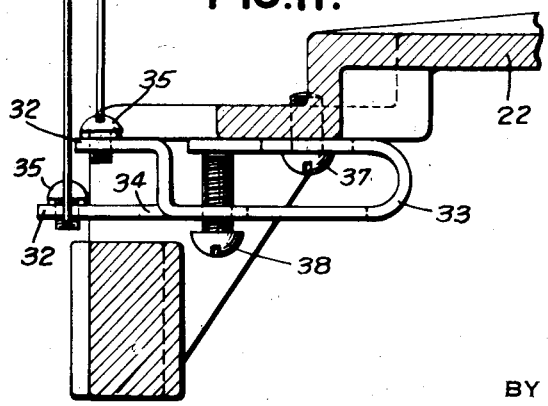

Patented Sept. 3, 1935

2,013,592

UNITED STATES PATENT OFFICE 2,013,592

DRUM SCALE

Edward J. Von Pein and Ernest Albert Reussenzehn, Dayton, Ohio, assignors, by mesne assignments, to The Hobart Manufacturing Company, Troy, Ohio, a corporation of Ohio Application June 14, 1932, Serial No. 617,091

5 Claims. (Cl. 265—39)

This case relates to weighing scales and particularly to the "store" or "counter" type of computing drum scale.

Computing scales of the drum type while providing the merchant with both a weight and a price reading of an article, provide the customer only with the weight reading. It has been proposed to duplicate the price readings on the drum to provide the customer with a price reading but such scales have never before been built for several reasons. One of these reasons is the confusion to both merchant and customer caused by the inverted characters appearing on the drum after the latter has moved through half a revolution in cases where each drum half contains a duplicate set of graduations. Authorities on weights and measures have disapproved of such scales for this reason and also because it provides a dishonest merchant with a means for quickly reading an inverted price at a greater weight than that actually sold. This difficulty is even greater when the duplicate indications are in axially spaced columns as then the inverted characters appear throughout the entire range of the scale.

Another difficulty has been, where each half of a drum chart contains one of a set of duplicate price indications, to utilize the full range of the scale for weight readings irrespective of the price readings.

The object of the invention is first, to provide means for disabling the price readings after the drum chart has moved through its price range whereby inverted characters will not appear.

Another object is to provide an ingenious arrangement of weight readings for the full weighing range of the scale while at the same time disabling the price readings after the chart has moved through the price range.

Still another object is to provide a housing for the price disabling means which forms a part of an illuminating hood.

An object is further to provide a disabling means comprising a shutter having chart masking means on both the merchant's and customer's sides of the scale.

Various other objects and advantages of our invention will be obvious from the following particular description of one form of mechanism embodying the invention or from an inspection of the accompanying drawings and the invention also constitutes certain new and novel features of the construction and combination of parts hereinafter set forth in claims.

In the drawings:

Fig. 1 is a side view of the scale with the upper portion in section,

Fig. 2 is a front view of the drum chart and shutter at the merchant's side with the shutter open, Fig. 3 is a plan view of the drum and disabling means with the illuminating hood for housing the disabling means removed, Fig. 4 is an end view of the drum chart and shutter construction with the outer casing removed, Fig. 5 is a detail of the right hand end of the drum at the merchant's side with the shutter closed, Fig. 6 is a detail of the left hand end of the drum chart at the customer's side with the shutter open, Fig. 7 is a detail similar to Fig. 6 with the shutter closed, Fig. 8 is a development of the chart, Fig. 9 is a front detail view of the sight lines of the chart and their supports, Fig. 10 is a side detail view of the sight lines and their supports, and Fig. 11 is a section on line 11—11 of Fig. 10.

Referring to Fig. 1, the platform 10 is mounted on spider 11 bearing on base lever 12 which is connected at its nose end to draft rod 13. The latter is hooked to the zero adjustment block 14 which carries the U-bar 15 for connection to counterbalance springs 16 and equalizer bar 17 for connection to racks 18. The latter drive the drum shaft (not shown) which is mounted in bearings 19 to rotate the drum chart 20. There is a spring 16, rack 18, and bearing 19 at each end of the drum chart, only one of each being herein shown for purposes of illustration, and a frame 22 at each end (see Fig. 2) for mounting these parts. The scale housing comprises a base casing 24, a column casing 25 with a T-head 26, and lower drum halves 27. The latter are formed with integral pressed-out portions 28 which mount the reading lens 29. Behind the lens is the unit price face 30 fixed at each end to the end frame 22 and in back of the price face are the zero or sight lines 31.

For further details of above construction, attention is called to Patent No. 1,690,258.

On the merchant's side of the scale, two sight lines 31m are provided to prevent parallax errors. The manner in which these lines are secured to the end frames 22 will be explained with reference to Figs. 9 to 11. Each sight line is stretched across the grooved noses 32 of brackets 33 and 34 of slightly flexible material, there being one of each bracket at each end of the drum chart fixed to an end frame 22. The ends of the lines 31m are secured to the brackets by screws 35.

The brackets are provided with elongated slots 36 through which screws 37 pass to fasten the brackets adjustably to the end frames. The brackets are both formed with a U-bend so that screws 38 threaded into the outer leg of the U and impinging the other leg may by adjustment spread the legs more or less apart to correctly tauten lines 31m. In order to permit the lines 31m to be on the same level, the bracket 33 is formed at its forward end with a right angular bend to locate the nose end 32 thereof in a plane at the side of the nose end of the bracket 34.

The scale has a total weight capacity range of twenty-four pounds. The chart 29 for half the weight range provides duplicate computations to be read by the merchant and customer from opposite sides of the scale. As indicated in the development of the chart, Fig. 8, substantially one-half is covered with price computations to be read by the merchant and the opposite half covered with duplicate price computations to be read by the customer. The sight line 31c of the customer and the sight line 31m of the merchant are substantially 180° apart so that when a certain computation is presented at the sight lines of the merchant, the duplicate computation is presented at the sight line of the customer. Thus reading the merchant's side (with the sheet held upright) at 10½ pounds, the merchant's sight line 31m reads at ten cents a pound, 1.05; while reading the customer's side (with the sheet held upside down) at 10½ pounds and ten cents a pound, the customer's sight line also reads 1.05. The maximum weight at which price computations can be obtained from the chart is twelve pounds which is half the range of the chart movement.

It is desirable to use the scale to its full capacity for measuring weights up to twenty-four pounds although computations can be had only to twelve pounds. The chart therefore has a weight column 40 to be read by the customer which extends over the entire twenty-four pound range of the chart. For the merchant, the chart provides two laterally displaced weight columns 41 and 42, the former giving weights from zero to twelve pounds and the other being a continuation giving the weights from twelve to twenty-four pounds. The purpose of providing two laterally spaced weight columns 41 and 42 instead of a single one as column 40 is to compel the merchant if desiring to read weights over twelve pounds to disable the price reading portions of the drum whereby the reading of prices after the chart has moved through its price range is prevented.

The disabling means for the price portion of the chart is described below: Secured by screws 45 to the top castings 46 of the end frames 22 is the upper curved drum casing half 47 which extends from one end of the scale to the other to completely cover and protect the upper part of the chart. At opposite ends, the upper part 47 has fixed to it by studs 48, curved brackets 49 and 50. The right hand bracket 49, as viewed in Fig. 3, centrally carries a stud 51 to rotatably support a spool or pulley 52 provided with two circumferential grooves 53 and 54. Bracket 50 also carries adjacent each end a stud 56 to rotatably mount a roller 57 having a lower circular portion 58 and a shoulder 59 above said portion.

Retained between the shoulders 59 and the peripheries of small friction-reducing rollers 60 rotatably carried by the bracket 49 is a curved metal strip 62, springs 63 urging the shoulders 59 yieldingly towards the top of the strip to frictionally hold the strip in adjusted position.

The strip is also retained between the bottom of pulley 52 and the rollers 60, spring 64 on stud 51 providing a frictional engagement between the bottom of the pulley and the top of the strip. Strip 62, as may be seen in Fig. 3 has circumferentially directed slots 65 which receive the round portions 58 of guide rollers 57 and is retained by these rollers against appreciable axial movement. The strip 62 is thus guided by rollers 57 to move substantially concentrically of the chart, the extent of such movement being limited by the ends of slots 65.

Strip 62 has at the left hand side (as viewed in Fig. 4) or at the merchant's side of the scale, a manipulating handle 67 and at the right hand side or customer's side a shutter 66. With the exception of the handle, all the parts, namely; those characterized by numbers 51 to 66 are duplicated at the left hand end of the scale (as viewed in Figs. 2 and 3) and these duplicate parts will be characterized by primes. The strip 62 also carries a stud 68 to which is made fast by screw 69 one end of a cable 70. The cable 70 is then directed circumferentially over a roller 71 rotatably carried by the stud 48 into the upper groove 53 of pulley 52. Referring to Figs. 2 and 3, it will be seen that the cable 70 extends axially of the drum chart from pulley 52 across the casing part 47 into the lower groove 54' of left hand pulley 52' and then circumferentially towards the merchant's side to be anchored to stud 72' (see Fig. 3) which is fast to the strip 62' at the left hand end of the scale (as viewed in Fig. 3).

Adjacent the customer's side of the scale, strip 62' has fixed to it the anchor stud 68' to which one end of cable 70' is held by screw 69'. The cable 70' extends circumferentially from this stud over guide roller 71' into the upper groove of pulley then axially of the chart across the scale into the lower groove of pulley 52 and then towards the customer's side to be anchored to the stud 72 fast to strip 62.

Strip 62' carries the shutter 66' at the merchant's side.

The action of the above parts is as follows: Movement of the handle 67 from the full line position in Fig. 4 upwardly to the dotted line position moves the strip 62 to which it is rigidly secured clockwise, in Fig. 4, thereby moving the shutter 66 from upper full line position in which it is above the sight window at the customer's side of the chart, exposing all the columns thereof to be read (see Fig. 6) to the lower dotted line position in which it masks or disables reading of the price computation columns of the chart, leaving only the weight column exposed (see Fig. 7). At the same time, strip 62 through its anchor stud 72 pulls cable 70' downwardly towards the customer's side of the scale thereby moving it to the right (as viewed in Figs. 2 and 3) and circumferentially upwardly at the left hand side of the scale. The cable 70' in moving upwardly through anchor 68' moves the strip 62' towards the merchant's side of the scale and thereby displacing the shutter 66' from full line (Fig. 4) chart exposing position (see Fig. 2) to dotted line (Fig. 4) chart masking or disabling position (see Fig. 5).

In this manner, whenever the merchant moves handle 67 upwardly both shutters 66 and 66' move downwardly over all the price computation columns of the chart.

When the handle is moved downwardly again from dotted line to full line position, strip 62 moves counterclockwise (as viewed in Figs. 1 and 4) thereby positioning shutter 66 rigid therewith in upper full line chart exposing position. At the same time, the anchor 68 pulls the cable 70 downwardly towards the merchant's side and to the right (as viewed in Fig. 3) then after it passes around pulley 52' upwardly towards the customer's side. Through anchor 72', the cable 70 thereupon moves strip 62' and shutter 66' upwardly into full line chart exposing position.

In this manner whenever the merchant pulls handle 67 downwardly, both shutters move upwardly to chart exposing position. Since both strips 62 and 62' are always moved by handle 67 equal distances in opposite directions, the cables 70 and 70' are always maintained taut although only one cable at a time serves as an actuating link. Thus, in the downward movement of the shutters 66 and 66', cable 70' is the active connection between the handle and strip 62' while in the upward movement of the shutters, cable 70 is the active connection between the handle and strip 62'. However strip 62' when it is moved downwardly by cable 70' through anchor stud 72' positively pulls cable 70 along with it thereby preventing slacking of the cable 70 due to its being pushed up at the anchor connection 68. Similarly when strip 62' moves upwardly through anchor 68' it positively pulls along the cable 70' preventing slacking thereof due to its being pushed up at anchor connection 72.

Referring to Figs. 2, 5, and 8, the reason why two laterally or axially spaced successive twelve pound range weight columns 41 and 42 are provided for the merchant's reading instead of one continuous column will be explained: Shutter 66 should be operated to mask the price computations on both merchant's and customer's side after the chart has moved through its twelve pound range which cover the computation range. In order to prevent incorrect reading of prices after the twelve pound range has been completed, should the shutters 66 and 66' be up and an article over twelve pounds be placed on the platform, the indicating or graduated portion of weight column 41 will have moved above the index lines 31m. At the same time, the graduated, indicating, portion of weight column 42 will have moved into cooperation with index lines 31m but will be shielded from view of the merchant by an integral depending finger 75 laterally offset to one side of the shutter 66' (see Fig. 2). Thus neither weight column 41 nor 42 will present a reading to the merchant and the weight of an article over twelve pounds will be undetermined. To enable the merchant to determine the weight of the article over twelve pounds, it is necessary for him to move handle 67 upwardly to locate the shutters in price disabling, masking, or shielding position, as explained above. Movement of the shutter 66' downwardly into masking position locates the top of finger 75 below the sight opening in unit price plate 30, thereby exposing weight column 42 at the same time that shutter 66' conceals weight column 41 (see Fig. 5).

To conceal and protect the parts of the shutter mechanism, a hood 80 is provided comprising a one-piece structure, preferably formed of sheet metal and fastened by screws 81 to the upper drum half 41. The hood extends over the shutter mechanism on each side and overhangs the sight windows of the merchant and customer. To illuminate the chart, the hood is provided with lamps 82 which light when a load is placed on the platform, in a manner well-known to the art.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims:

We claim:

1. In a scale, a load support, counterbalancing and indicating means operated by the support upon imposition of a load thereon, the indicating means comprising a rotatable chart means having duplicate sets of indications, each set covering half the weight range of the scale and a set of weight indications covering the full weight range of the scale, a housing having a sight opening through which one of the duplicate sets of indications and the weight indications are simultaneously visible during the movement of the counterbalancing and indicating means through half its weight range, a shutter element movably mounted to expose or mask the duplicate indications from view through said opening, an auxiliary shutter element for masking the weight indications extending through the second half of the weight range of the chart while the duplicate indications are exposed to view, and means for moving the first-mentioned shutter element to masking position and simultaneously moving the auxiliary shutter element to unmasking position to thereby expose the second half of the weight indications to view while masking the duplicate indications from view.

2. In a scale having a certain automatic total weighing capacity or range; a goods platform, counterbalancing means and a rotatable drum chart operated by goods on said platform having a maximum weight equal to said total weighing capacity, said drum chart having duplicate sets of weight indications extending around substantially the full periphery of said chart to indicate weights to the total automatic capacity of the scale, said drum chart also having duplicate sets of parallel columns of weight proportional value indications, the duplicate value columns of one set being on the diametrically opposite side of the chart from the duplicate columns of the other set to thereby indicate values proportional to half the total weighing capacity of the scale, a housing for the chart having opposite sight windows, each for exposing one of the sets of value indications in upright position only through half the total weighing capacity of the counterbalancing and chart means and for simultaneously exposing one of the sets of weight indications in upright position, and a pair of shutters mounted for movement relative to the housing and chart, each into a position in front of one of said windows to extend across all the value columns of a set and to mask them from view through said sight windows after the scale passes through half its weighing capacity and to leave each set of weight indications exposed for simultaneous view through the opposite sight windows to indicate weights at opposite sides of the scale through the succeeding and final half of the total weighing capacity whereby reading of the weight through the latter half of the weighing capacity will not be confused by inverted value indications of the value columns.

3. In a scale, a goods platform, counterbalancing means and a rotatable drum chart operated by the weight of goods on said platform, said chart having duplicate sets of indications, a housing for the chart having opposite sight windows, each for exposing one of said sets of indications in upright position, a pair of shutters, one for each window, to mask the indications from view through said windows, a frame rigid with said housing for rotatably carrying the shutters, a pair of pulleys rotatably journaled on said frame, a pair of cable connections, each extending from one of said shutters around both pulleys and connected to the other shutter to transmit rotational movement of one shutter as an oppositely directed rotational movement of the other shutter, each one of said pair of cable connections extending around said pulleys in opposite direction to the other cable connection whereby rotational movement of one shutter is transmitted by a positive pull of one of the cable connections to the other shutter to move the latter in an opposite rotational direction, said shutters lying normally at the same sides of the sight windows whereby their opposite rotational movements from normal positions are adapted to bring the shutters into chart masking positions in front of said windows.

4. In a scale, a load support, counterbalancing and indicating means operated by the support upon imposition of a load thereon, a housing, the indicating means comprising a rotary drum chart within the housing and having duplicate sets of indications adapted to be viewed in upright, readable position from opposite sides of the housing, each such set covering substantially half the range of movement of the chart, the chart also having weight indications covering the full range of the chart, the weight indications covering the first half of the range of movement of the chart being exposed for view from one side of the housing simultaneously with the exposure at the latter side of one of said duplicate sets of indications and the weight indications covering the second half of the range of movement of the chart being concealed from view at said latter side when said duplicate set is exposed therethrough during the second half of the scale range, and shutter means arranged and constructed to simultaneously conceal said duplicate sets at opposite sides of the housing and simultaneously cause the second half of the weight indications to come into view through the second half of the chart range.

5. The scale as defined in claim 4, said weight indications being arranged in laterally offset columns, one extending through the first half of the chart range and the other extending through the second half of the chart range, said housing having a sight window through which the indications are exposed for view, said shutter means having a portion which in one position covers the part of the sight opening through which the second half weight column is exposed to view and having another portion which in another position of the shutter covers the part of the sight opening through which the duplicate sets and the first half weight column are exposed for view, movement of the shutter means from the first-named position to the second removing the first-named portion from in front of the sight opening and bringing the second-named portion in front of the sight opening and movement of the shutter means from second to first position removing the second shutter portion from in front of the sight window and bring the first shutter portion in front of the sight window, whereby the second half of the weight indications cannot be viewed while the duplicate sets are exposed and whereby the first half of the weight indications cannot be viewed when the duplicate sets are masked from view.

EDWARD J. VON PEIN.
ERNEST ALBERT REUSSENZEHN.